(12) United States Patent
Granath

(10) Patent No.: US 7,733,767 B2
(45) Date of Patent: Jun. 8, 2010

(54) SERVICE ALARM CORRELATION

(75) Inventor: Johan Granath, Stockholm (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 59 days.

(21) Appl. No.: 11/791,748

(22) PCT Filed: Nov. 29, 2004

(86) PCT No.: PCT/SE2004/001769

§ 371 (c)(1),
(2), (4) Date: May 1, 2008

(87) PCT Pub. No.: WO2006/057588

PCT Pub. Date: Jun. 1, 2006

(65) Prior Publication Data

US 2008/0276135 A1 Nov. 6, 2008

(51) Int. Cl.
*G01R 31/08* (2006.01)
(52) U.S. Cl. .................. 370/216; 370/230; 370/253
(58) Field of Classification Search ............... 370/230, 370/530; 709/203
See application file for complete search history.

(56) References Cited

U.S. PATENT DOCUMENTS 5,636,203 A 6/1997 Shah
6,481,005 B1 * 11/2002 Crowley et al. ............ 717/100
6,810,496 B1 * 10/2004 Vittal ......................... 714/57
2003/0206620 A1 * 11/2003 Taylor ....................... 379/229
2004/0223461 A1 11/2004 Scrandis et al.
2004/0261116 A1 * 12/2004 Mckeown et al. .......... 725/109

FOREIGN PATENT DOCUMENTS

WO 2004/008718 1/2004

OTHER PUBLICATIONS

International Search Report for PCT/SE2004/001769 mailed Jul. 18, 2005.
Gardner et al., "Fault Resolution and Alarm Correlation in High-Speed Networks using Database Mining Techniques," Information, Communications and Signal Processing, 1997, Proceedings of 1997 International Conference, pp. 1423-1427, XP010264089.

* cited by examiner

*Primary Examiner*—Ricky Ngo
*Assistant Examiner*—Iqbal Zaidi
(74) *Attorney, Agent, or Firm*—Nixon & Vanderhye P.C.

(57) ABSTRACT

A system and method for correlating alarms from a plurality of network elements (NEs) are provided to unambiguously associate separate alarms to one another. This is accomplished by a method where a fault identifier FID is generated by a serving NE who discovered the faulty hardware or software unit. The serving NE signals its lost or degraded service to a client NE in a traffic message and appends the generated FID to the traffic message. The client NE extracts the FID from the traffic message and appends it to a service alarm which the NE sends to a network management system. The serving NE also generates an alarm message and provides it with same FID. The serving NE sends the alarm message and its FID to the network management system. The service alarm and the alarm message received by the network management system will thus contain the same FID. In the management system the FID is used to correlate the two alarms with one another.

15 Claims, 1 Drawing Sheet

SERVICE ALARM CORRELATION

This application is the U.S. national phase of international application PCT/SE2004/001769 filed 29 Nov. 2004, which designated the U.S., the entire content of which is hereby incorporated by reference.

TECHNICAL FIELD OF THE INVENTION

The present invention relates to a method, system and network elements for processing alarm information within a telecommunication network managed from a network management system.

DESCRIPTION OF RELATED ART

The objective for an operator supervising the telecommunication network via a network management system is to be able to restore quickly degraded or lost services by locating and correcting a faulty unit causing the degraded or lost service. When alerted of a degraded or lost service, the operator needs hence to associate or correlate the lost service with/to the responsible faulty unit.

Network Elements (NEs) in a telecommunication network have different tasks which together aim to connect two or several user equipments (UEs) together. The NEs may depend on each other in such way that if one NE fails then another NE will fail to provide its services as consequence (a client-server relationship between NEs). An NE comprises hardware (HW) units and software. Software is stored in a memory and runs under control of a processor and operation system. HW units may further include specific HW units providing the functionality supported by the NE. Within an NE a number of functions execute. These functions may act as serving functions to client functions in other NEs and if the function is faulty in serving NE then the client NE will have its service degraded or lost as consequence. For example, a faulty board in a radio base station (RBS) may show up in a client Radio Network Controller (RNC) as a message "cell disabled" indicating that the operational state of the cell with the RBS containing the faulty board is out of order.

Due to commercial reasons operators tend to mix NEs from different vendors in their telecommunication networks. To limit dependencies in implementation the information to be shared between NEs is limited. In a radio network typically the information shared to set up radio functions is standardised, but not information about HW equipment.

The disadvantage of not being able to inform a client NE about the faulty HW in the serving NE is that each NE will send an alarm to the network management system, but the alarms are not correlated, i.e. have no unique association to one another. The alarms upon reception in the network management system are time stamped and stored, for example in a database 10. When displaying the alarms in an alarm list the two alarms will be separated by other alarms, which have been received from same or other NEs during same time period. The operator has then a difficult task to conclude that a service alarm from client NE is the consequence of a faulty HW in serving NE. Time and competence to locate the fault and thereby restore service increases.

SUMMARY OF THE INVENTION

One object of the invention is to provide a solution to the problem of correlating alarms, triggered by network elements that have a dependency of one another, such that the alarms are unambiguously associated with one another.

Various aspects of the invention are based on a fault identifier (FID) mechanism, which provides a unique association between the lost service and the responsible faulty unit.

DETAILED DESCRIPTION

Figure 1:
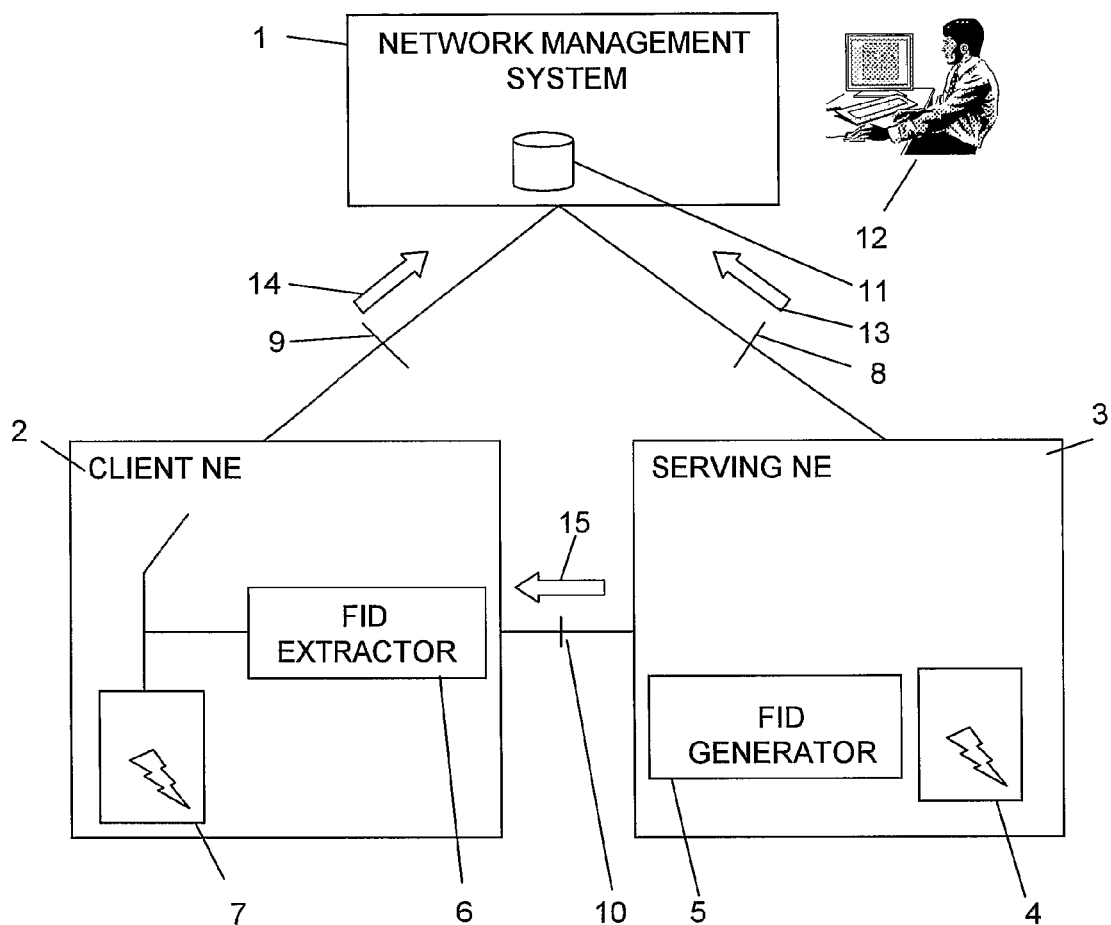
FIG. 1. is a block diagram of a managed network for a telecommunication system, and FIG. 2. is a schematic view of a list of collected alarms in the network management system.

FIG. 1 shows a network management system (NMS) 1, a client network element (NE) 2 and a serving NE 3. In the serving NE there is a faulty hardware (HW) or software unit 4 and fault identity (FID) generator 5. In the client NE there is a FID extractor 6 and faulty service detection means 7. Between the serving NE and the NMS as well as between the client NE and the NMS there are management interfaces 8 and 9 respectively. Between the serving and client NEs there is a traffic interface 10.

The serving NE has the task to set up and maintain a certain set of services, which the client NE is in control over. Typically in a cellular radio network the serving NE is a radio base station (RBS) supplying, for example, user equipments (UEs) in a range of a radio cell with user data such as speech or images.

The client NE in such a cellular radio network is typically a radio network controller (RNC), having the task to control one or several connected RBSes acting as serving NEs. The RNC controls the RBSes to set up and maintain UEs with requested services, for example speech connections and controls that UEs can roam between cells served by several RBSes.

An NE emits an alarm when a faulty hardware unit is detected and makes the alarm available over the management interface. The alarm generating mechanism in the NE appends following information in the alarm:

Who: The name of the device or NE experiencing the fault
What: The condition of the fault, i.e. the symptom of the fault
When: The time the problem was detected In addition to the NEs above, a telecommunications network has one or more NMSes, which among other things, are used to supervise the NEs. For supervision the NMS has a mechanism to receive and store alarms, for example in a database 11 and present the alarms to an operator of an operator console 12. The NMS communicates with each respective NE via the management interfaces. Management messages are exchanged between the NEs and the NMS over the management interfaces. The traffic interface between client NE and serving NE provides traffic messages for negotiating the services requested by the client NE. Specifically in a radio network the interface provides traffic messages to add and delete cells served by the RBS to support a connection between the UE and the RNC. The information exposed over the traffic interface is however limited. This is due to the fact that operators tend to mix NEs from different vendors in their telecommunication networks. Standardization bodies have agreed upon the use of general and implementation-independent service primitives in the traffic interface in order to limit dependencies between vendors' implementation. For example it is not possible to send information on the identity of a failing HW or software unit over the traffic interface, the only information exposed over the interface is that the serving NE has a failure and cannot deliver the service requested by the client NE. The disadvantage of not being able to inform a client NE about the faulty HW in the serving NE is that both NEs will send alarms to the network management system, but the alarms are not correlated, i.e. they have no unique association to one another. The operator has then a difficult task to conclude that a service alarm from the client NE is the consequence of a faulty HW in serving NE. Time and competence to locate the fault and thereby restore service increases.

An overview of the alarm processing method pursuant to an embodiment of the present invention is provided in FIG. 1. When the serving NE detects the faulty hardware unit it sends an alarm, said alarm referred to as a hardware alarm 13, to the NMS. The non-shown device in the serving NE which discovered the faulty hardware unit retrieves a unique fault identifier (FID) from the FID generator 5. The unique FID is generated by combining a NEs network unique name with an integer. The integer is derived from a 19 bit variable and is stepped with 1 for every new fault. An example for a FID: RBS1.sub.-262143, where RBS1 is the network unique name of the network element and 262143 is the decimal equivalent to the 19 bit variable.

The FID is appended to the hardware alarm and forwarded to the NMS over the management interface 8. The hardware alarm is stored in the database 11 and is presented to the operator in an alarm list 16 to be described below in connection with FIG. 2. Upon detection of the faulty HW or software unit the serving NE also sends a traffic message 15 to the client NE and appends the same FID to it. The traffic message informs the client NE that the requested service is no longer available. The client NE receives the traffic message with the appended FID and generates in response thereto an alarm indicative of the lost service, the alarm referred to as a service alarm 14. In particular the client NE extracts the FID from the traffic message and appends it to the service alarm 14. The service alarm with the appended FID is forwarded to the NMS over the management interface 9. The NMS upon reception stores and presents the service alarm with the appended FID in the alarm list.

Figure 2:
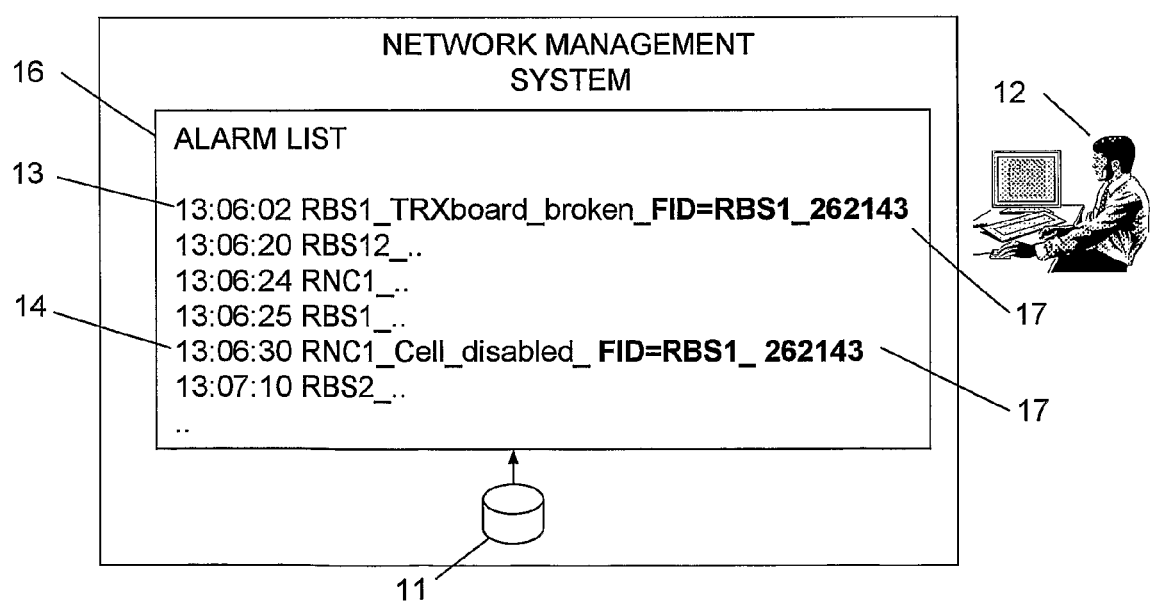

FIG. 2 shows an alarm list 16 with a number of alarms received from many different serving and client NEs in the cellular radio system. There is one alarm listed on each row and the list is possible to scroll. The list is made from the stored hardware and service alarms in the database. The alarms contain the identity of the NE experiencing the fault, such as RNC or RBS and also the reporting faulty unit or service. The detection time may also be part of each alarm. The alarms are listed in the chronological order they where generated and time-stamped in the NEs. As shown there are many other alarms which have been generated in same or other NEs supervised by same NMS during the time span from the reception of the hardware alarm 13 and the reception of the service alarm 14. As shown it is easy to unambiguously associate the hardware and service alarms to each other by the FIDs 17 which both emanate from one and the same detected failure.

While the system and method shown and described is the preferred, it is apparent that the FID can be generated in other ways than from combining a NEs network unique name with an integer. A unique FID may be obtained by assigning each NE a number series and by assigning different number series to individual NEs. The FID may thus be generated within each NE as a randomly selected number within the assigned number series.

The invention claimed is:

1. A system for correlating alarms from a plurality of network elements NEs in a telecommunications network, the system comprising:

a client NE and a serving NE which depend on each other in such way that if the serving NE fails, then the client NE will fail to provide its services as a consequence, the serving NE being configured to signal traffic messages to the client NE without providing information on a faulty hardware or software unit in the traffic messages; and a network management system structured to supervise the client and serving NEs and to receive and store alarms from the client and serving NEs, wherein the serving NE comprises:

means for generating a fault identifier (FID) related to the faulty hardware or software unit;

means for forwarding an alarm message to the network management system and including therein the FID; and means for providing the traffic message with the same FID to the client NE, wherein the client NE comprises:

means for extracting the FID from the traffic message from the serving NE and appending the extracted FID to a service alarm message expressing a service fault; and means for forwarding the service alarm message to the network management system, and the network management system receives separately the alarm message from the serving NE and the service alarm message from the client NE.

2. The system in accordance with claim 1, wherein the means for generating the FID generates a randomly selected number for each fault.

3. The system in accordance with claim 1, wherein the means for generating the FID combines a name of the serving NE with an integer, wherein the integer is stepped for every new detected fault.

4. The system in accordance with claim 1, information exposed in an interface between the serving NE and the client NE comprises information to set up and maintain traffic connections between the client and serving NEs, but not information to identify the faulty hardware or software units.

5. The system in accordance with claim 1, wherein the system is a radio network, the serving NE is a radio base station, and the client NE is a radio network controller.

6. A serving network element (NE), comprising:

a memory unit structured to store therein program software for a service and for operating the service under a control of a processor;

hardware (HW) for the service and for operating the service;

an interface towards a client NE to send a traffic message, the interface having service primitives for signaling availability of requested services in the traffic message but having no service primitives for signaling of a faulty hardware or software unit of the serving NE in the traffic message;

an alarm interface towards a network management system to send an alarm message;

fault detection means for detecting the faulty hardware or software unit in the serving NE; and means for generating the alarm message in response to a detection of the faulty hardware or software unit by the fault detection means, the alarm message being forwarded to the network management system wherein the means for generating the alarm message comprises:

a device for generating unique fault identifiers (FIDs); and a device for appending the generated unique FID to the alarm message sent to the network management system over the alarm interface, and for appending the same unique FID to a the traffic message sent to the client NE over the interface towards the client NE, and wherein the alarm message to the network management system and the traffic message to the client NE are separately sent.

7. A client network element (NE), comprising:

a memory unit structured to store therein program software for a service and for operating the service under a control of a processor;

hardware (HW) for the service and for operating the service;

an interface towards a serving NE to receive a traffic message, the interface having service primitives for signaling availability of requested services but having no service primitives for signaling of faulty hardware or software unit of the serving NE in the traffic message;

an alarm interface towards a network management system to send a service alarm message;

fault detection means for extracting service primitives in the traffic message received from the serving NE; and means for generating the service alarm in response the fault detection means extracting service primitives indicative of an inability of the serving NE to provide the requested service, the service alarm being forwarded to the network management system, wherein the fault detection means is structured to extract a fault identifier (FID) appended to the service primitives indicative of the inability of the serving NE to provide the requested service, wherein the client NE further comprises a device for appending the extracted FID to the service alarm generated in response to the fault detection means extracting the service primitives indicative of the inability of the serving NE to provide the requested service, and wherein the alarm message sent to the network management system correlates to an alarm message separately sent by the serving NE to the network management system related to the service primitives received from the serving NE.

8. A method for correlating alarms from a plurality of network elements (NEs) in a telecommunications network including a client NE and a serving NE, that depend on each other in such way that if the serving NE fails, then the client NE will fail to provide its services as a consequence, the method comprising:

the serving NE discovering a faulty hardware or software unit and in response thereto forwarding an alarm message indicative of the faulty hardware or software unit to a network management system;

the serving NE forwarding to the client NE a traffic message indicative of an inability of the serving NE to provide a requested service, wherein information on the faulty hardware or software unit is not included in the traffic message;

the client NE receiving the traffic message and forwarding in response thereto a service alarm message indicative of a lost service to the network management system; and the network management system storing the alarm message from the serving NE and the service alarm message from the client NE and presenting them to an operator, wherein the step of the serving NE forwarding the alarm message to the network management system and the step of forwarding the traffic message to the client NE comprise: the serving NE, upon detection of a faulty hardware or software unit, generating a fault identifier (FID) and associating the FID with the detected faulty unit; and the serving NE appending the FID to the traffic message which it transmits to the client NE and to the alarm message which it transmits to the management system, wherein the step of the client NE forwarding the service alarm message to the network management system comprises the client NE appending the FID to the service alarm message which it transmits to the network management system, and wherein the step of the network management system storing the alarm message from the serving NE and the service alarm message from the client NE and presenting them to the operator comprises the network management system, upon reception of the service alarm message and the alarm message, associating the two alarm messages, which are separately received, to one another using the FID.

9. The method in accordance with claim 8, wherein the FID is a randomly selected number unique for the serving NE.

10. The method in accordance with claim 8, wherein the FID is a combination of a name of the serving NE and an integer, wherein the integer is stepped for every new detected fault.

11. A serving network element in a wireless network, the serving network element comprising: a serving unit structured to provide service for a client network element (serving service); a fault detection unit structured to detect when a fault associated with the serving unit and to generate a fault identifier (FID) associated with the serving unit; a management interface unit structured to communicate with a network management system, the management interface unit sending a fault alarm message indicating the fault associated with the serving unit to the network management system, the fault alarm message having the FID included therein; and a traffic interface unit structured to communicate with a client network element, the traffic interface unit separately sending a traffic message having the FID included therein to the client network element, the traffic message comprising one or more implementation-independent primitives indicating that the serving network element is unable to fulfill the serving service, the implementation-independent primitives being such that information on the serving unit providing the serving service is not included in the traffic message.

12. The serving network element of claim 11, wherein the fault detection unit generates the FID such that FIDs generated due to first and second occurrences of a same fault are different.

13. The serving network element of claim 11, wherein the fault detection unit generates the FID such that each FID generated is unique from all other FIDs generated within the wireless network.

14. A client network element in a wireless network, the client network element comprising: a traffic interface unit structured to communicate with a serving network element, the traffic interface unit receiving a traffic message which comprises one or more implementation-independent primitives indicating that the serving network element is unable to fulfill a serving service, the implementation-independent primitives being such that information on a serving unit of the serving network element providing said serving service is not included in the traffic message; a fault detection unit structured to detect when the serving network element is unable to provide the serving service and to extract a fault identifier (FID) from the traffic message received from the serving network element via the traffic interface unit; and a management interface unit structured to communicate with a network management system, the management interface unit sending a service alarm message indicating that the client network element is unable to provide a service associated with the client network element (client service) to the network management system, the service alarm message having the FID included therein, and the service alarm message being related to a fault alarm message sent separately by the serving network element to the network management system and indicating a fault associated with the serving unit of the serving network element.

15. A network management system in a wireless network, the network management system comprising: a management interface unit structured to communicate with a client network element and a serving network element, the client network element receiving a serving service from the serving network element, and the client and serving network elements communicating with each other via implementation-independent service primitives in which information of a serving unit of the serving network element providing the serving service is not provided by the serving network element to the client network element; a storage unit structured to store therein a fault alarm message received from the serving network element indicating a fault with the serving unit of the serving network element, and to separately store therein a separately received service alarm message from the client network element indicating inability of the client network element to provide a client service, both the fault alarm message and the service alarm message including therein fault identifiers (FID); and an association unit structured to associate the fault alarm message and the service alarm message to each other based on the FIDs.

* * * * *